May 10, 1949.  W. L. RUSSELL  2,469,463
NEUTRON LOGGING OF WELLS
Filed Jan. 18, 1946  2 Sheets-Sheet 2

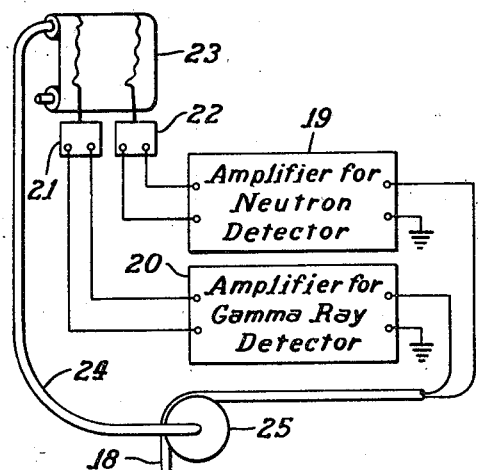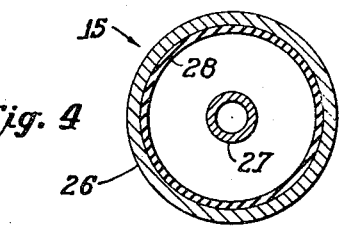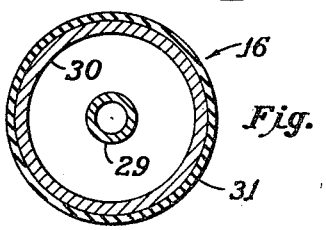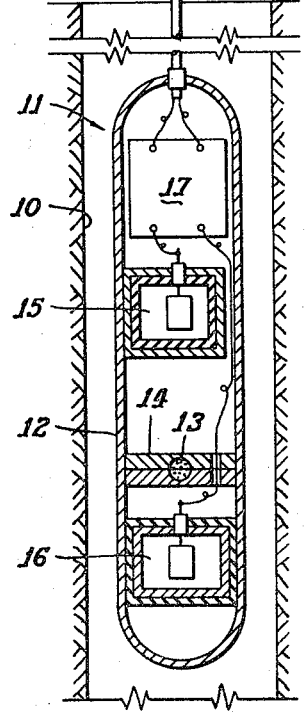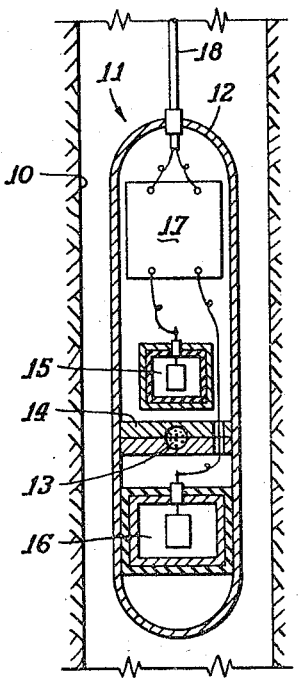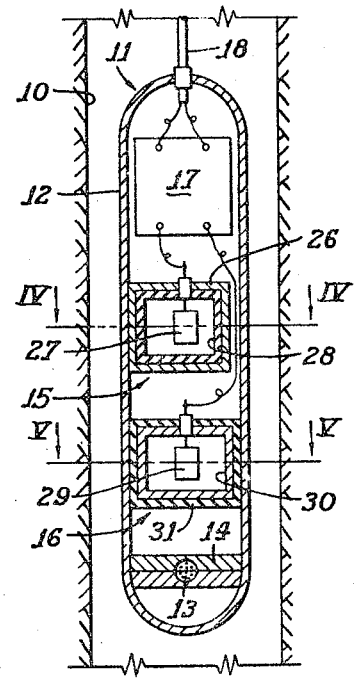

INVENTOR:
William L. Russell
BY Newell Potter
Attorney

Patented May 10, 1949

2,469,463

UNITED STATES PATENT OFFICE 2,469,463

NEUTRON LOGGING OF WELLS

William L. Russell, Tulsa, Okla., assignor to Stanolind Oil and Gas Company, Tulsa, Okla., a corporation of Delaware Application January 18, 1946, Serial No. 641,921

3 Claims. (Cl. 250—83.6)

This invention relates to the logging of wells and is directed particularly to that method of logging in which the well formations are irradiated by a source of neutrons and the effects thereby produced are recorded.

As is well known, high speed neutrons appear as one product of such atomic nuclear reactions as those occurring when certain element are bombarded by high velocity atomic particles. In well logging processes a source of neutrons, such as a mixture of radium or polonium and beryllium, is passed through the well bore, and the slowing down of these neutrons by collisions with the nuclei of the substances present, especially hydrogen, is detected. This detection is ordinarily carried out either more or less directly by arranging for the capture of the slowed-down neutrons within the detector itself, such as by use of the $BF_3$ ionization chamber, or indirectly as by measuring the gamma rays arising from slow neutron capture by elements outside the chamber.

Due to the wide variations in the abilities of different substances to capture slow neutrons and in the phenomena accompanying such captures, there are both advantages and disadvantages in the indirect method of detection by measuring gamma rays of capture. By observing the intensity and spectral distribution of these rays it is possible not only to estimate slow neutron density but also to learn something of the particular elements responsible for capture. However, the gamma rays which actually make the neutron logs produced by this method originate not only in the rocks, but also in the fluids in the hole, in the detector walls, and in the cement and casing where the well has been so completed. Compared to the capture rays produced elsewhere, the relative effects of those originating within the detector walls are greatly emphasized by their being generated so close to the place of detection.

Considering the parameter of intensity, it is apparent that, because the chemical composition of the detector walls remains constant, the intensity of the capture gamma rays produced there will be proportional to the slow neutron concentration within the walls. This is affected chiefly by the hydrogen content of the surrounding fluids and rocks. On the other hand, the intensity of the capture rays originating in the rocks, while also influenced by the hydrogen content, is also subject to variations due to the nature of the elements present—in other words, to lithologic characteristics other than hydrogen content.

Regarding the hardness or spectral distribution of the capture rays, it may be presumed that on the average those coming from the formations are harder due to the filtering out of softer rays by the intervening matter, whereas the rays arising in the detector walls are probably softer but are of uniform and constant hardness. Also the hardness of these harder capture rays coming from the formations varies with the nature of the atomic nuclei responsible for the captures, and is thus indicative of lithologic variations other than porosity.

When a single gamma ray detector is employed for neutron logging according to the usual process, it is generally not possible to say whether any given ray observed by the detector is a strong one coming from a capture occurring in the formation and partially absorbed by passage through intervening matter, or whether it is a relatively weak one originating in the detector wall. In other words, the interpretation of present well logs of the gamma rays of neutron capture is hampered by a lack of knowledge about the place of origin of such rays.

It is accordingly a primary object of my invention to provide a novel and improved method and apparatus for neutron well logging. Another object is to provide in neutron well logging a method and apparatus for separating the received information into indications of slow neutron density and indications of the ability of the formations present to generate penetrating gamma rays of neutron capture. A further object is to assist in the interpretation of neutron well logs by providing a logging method and apparatus capable of yielding information as to the place of origin of the gamma rays of neutron capture. Still another object is to provide for distinguishing variations in detector response due to porosity changes from variations due to other causes. A still further object is to provide a method and apparatus by which changes in lithology and in the concentration of elements other than hydrogen are measured with accuracy. Yet a further object is to provide a method and apparatus capable of making neutron well logs with increased speed and accuracy. Other and further objects, uses, and advantages of the invention will become apparent as the description thereof proceeds.

To state the matter briefly, these objects are accomplished according to my invention by the simultaneous use of two gamma ray detectors, one of which has walls of greater ability than the walls of the other to generate gamma rays of capture. For greatest sensitivity the difference between the two detectors in this respect is preferably made as large as possible; that is, the generation of capture gamma rays in the walls of one detector is greatly increased, while in the other it is decreased or even substantially eliminated. Then the response of the "generating" detector will be primarily to the neutrons reaching it after being slowed down by passage through the intervening matter between it and the source, and only relatively minor variations will result from changing conditions of neutron capture in the formations. On the other hand, the "non-generating" detector will be quite insensitive to the neutrons reaching it, and the major portion of its response will be to the gamma rays of capture generated outside it in the formations. Further, the discrimination of this latter detector against neutrons and in favor of the gamma rays from the formations can be made even greater by a careful choice of spacing from the neutron source, in the manner more fully pointed out hereinafter.

These principles of my invention and their application in a practical method and apparatus for well logging will be more clearly understood by reference to the accompanying drawings forming a part of this application for purposes of illustration. In these drawings, in which the same reference numeral in different figures refers to the same or a corresponding part, Figure 1 is a cross section of a well and an embodiment of the invention therein, together with surface recording equipment;

Figure 2 is a cross section of a well with a modification of the instrument of Figure 1 therein;

Figure 3 is a cross section of a well with an alternative embodiment of the instrument of the invention therein;

Figure 4 is a cross section of a neutron-sensitive detector on the lines IV—IV of Figure 3;

Figure 5 is a cross section of a gamma ray-sensitive detector on the lines V—V of Figure 3.

Figure 6:
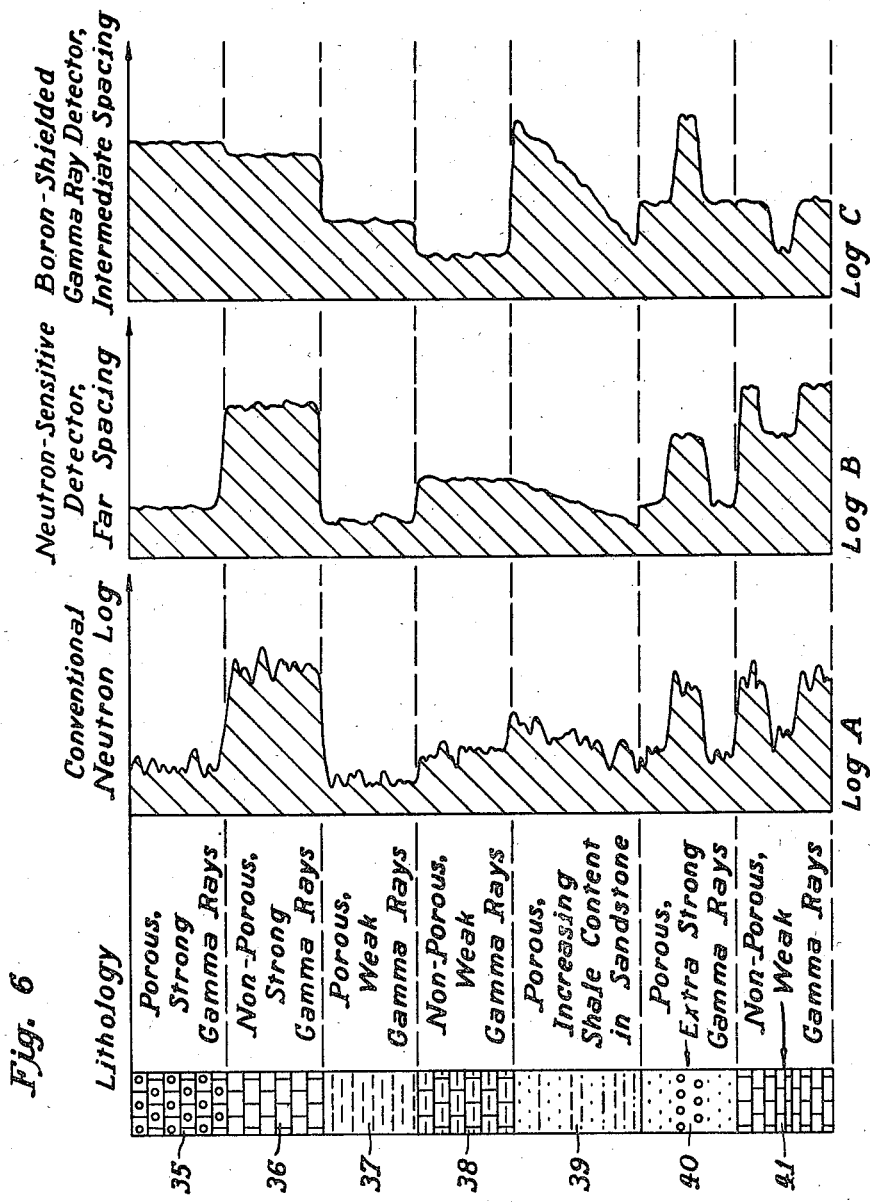
Figure 6 shows representative well logs obtained in the practice of the invention.

Referring now to Figure 1, which shows one embodiment of my invention, adapted to be passed through a well 10 is a logging instrument 11 having a fluid-tight case or housing 12 in which is fixed a source of neutrons 13. While any one of a number of substances or mixtures may be used as the neutron source, a mixture of radium and beryllium or of polonium and beryllium will be found suitable. Of these two specified mixtures the latter appears preferable because it is free from gamma rays which must otherwise be shielded from passing directly to the detectors. In any event source 13 may be surrounded by shielding 14 of lead or like material which has a negligible slowing effect on the neutrons and does not emit penetrating gamma rays upon capturing slow neutrons.

Within housing 12 and spaced on opposite sides of source 13 are a pair of gamma ray detectors 15 and 16, which for illustrative purposes are shown as ionization chambers, but may be any other type responsive to gamma radiation, such as Geiger-Mueller counters. In accordance with my invention detectors 15 and 16 are so constructed that the generation of gamma rays by neutron capture in their walls is different. Detector 15, for example, increases the generation of such rays by a lining of material which captures in ionization-producing events a larger than average portion of the neutrons reaching it. Detector 16, on the other hand, achieves the opposite effect by capturing such neutrons as reach it without the production of appreciable ionization, so that the major portion of its response is to the gamma rays of neutron capture produced elsewhere. For convenience in the subsequent discussion and only as an approximation, detector 15 may be termed "neutron-responsive" and detector 16 "gamma ray-responsive," though it will be apparent that this need not be strictly true. Detector 15 may have also an appreciable response to gamma rays originating outside of it, while detector 16 is not necessarily completely insensitive to neutrons. The fact that their responses differ is the important point.

Unit 17 in instrument 11 may include the necessary voltage supplies for the operation of detectors 15 and 16, as well as amplifiers for converting the detector outputs into signals suitable for transmission to the earth's surface by insulated conductors in cable 18. At the surface these signals may be further amplified, as needed, by amplifiers 19 and 20 and recorded as separate traces by recorder units 21 and 22 on a chart 23. This chart may be moved in accordance with the depth of instrument 11 in well 10 by a driving connection 24 from a depth-measuring sheave 25 over which cable 18 passes, in a manner well known in the logging art.

In Figure 2 is shown an alternative arrangement of source 13 and the detectors 15 and 16, which is preferable to the arrangement of Figure 1 in certain instances. Instead of being spaced farther than detector 16 from source 13, the neutron-sensitive detector 15 is here placed quite close to the source at a distance less than the spacing of detector 16. As in Figure 1, the two detectors are on opposite sides of the source.

Still a third possible arrangement of the source and detectors, also having certain advantages, is illustrated in Figure 3, wherein both detectors are on the same side of source 13, the neutron-sensitive detector 15 being spaced farther than the gamma ray detector 16 from the source.

Which of these arrangements is employed is to some degree optional, but also to be considered are some important limitations disclosed in my copending application S. N. 641,920 filed concurrently herewith. It is there pointed out that the slow neutron density is a good indicator of porosity only either quite close to or at some distance from the neutron source. In an intermediate range of distances the slow neutron density undergoes little or no variation with varying porosity or hydrogen content. One boundary of this intermediate range is normally around 3 to 6 inches from source 13, while the other boundary is 8 to 10 inches from the source of neutrons.

There are thus two optimum spacings for the neutron-responsive detector 15. In Figures 1 and 3 it is placed outside of this intermediate range, and thus more than 10 inches from source 13, while in Figure 2 it is close enough to source 13 to be inside this range and hence not farther than 3 to 6 inches from the source. On the other hand, the best location for the gamma ray-responsive detector 16 is within this intermediate range, preferably roughly centered in it at about 6 to 7 inches from source 13, where its reduced sensitivity to neutrons is rendered of even less importance because the number reaching it is practically constant. The variable component of the detector 16 output is then clearly related to the gamma radiation from externally occurring neutron captures. While it is important that neutron detector 15 should avoid the intermediate distance range, it is not essential that the gamma ray detector 16 be located within it. Although, when located elsewhere, a certain portion of the detector 16 output will vary with the number of neutrons reaching it, the main part of its response will be correlatable with the gamma rays coming from neutron captures within the surrounding media.

To some extent the particular type of neutron source used may dictate the detector arrangement. If direct gamma radiation from the source is appreciable, much of the space nearest it may be needed for shielding. In that event, of course, detector 15 cannot be spaced as contemplated in Figure 2 but must of necessity be placed outside of the intermediate spacing range.

With the two detectors on opposite sides of the source they respond at any instant to somewhat different portions of the well formations, which fact may or may not be considered important depending on the problem at hand. When both detectors are on the same side of the source so that they are simultaneously affected by the same part of the well formation, the strong absorption of neutrons by one of the detectors may influence the response of the other. It is such factors as these that must be weighed in choosing a source-detector arrangement for any specific operation.

While there are a number of ways for rendering the walls of detectors 15 and 16 respectively more and less capable of generating capture gamma rays, the preferred manner is shown generally in Figure 3 and in more detail in Figures 4 and 5. While it is possible to make detector 15 highly sensitive to neutrons by constructing it as an ionization chamber having outer and inner electrodes 26 and 27, respectively, (Figure 4), and filling the space between the electrodes with boron trifluoride, for the purposes of the present invention it is preferable to provide it with a thin inner lining 28 of a substance having a larger-than-average capture cross section for neutrons, and in which the captures are accompanied by ionization-producing events such as the emission of alpha, beta, or gamma rays. The interelectrode space is filled to a high pressure with an inert gas such as argon. Although it is desirable that the gamma rays, if any, emitted from the material of lining 28 have fairly low penetration so as to produce greater ionization in the gas-filled space, this is not essential, the primary requisites being only that there be a reasonably large capture cross section for slow neutrons and that the capture of each neutron be registered in terms of secondary phenomena which can affect detector 15. Such substances as lithium, germanium, rhenium, silver, cadmium, indium, neodymium, samarium, europium, gadolinium and other rare earths, gold, mercury, thorium, uranium or materials containing them as alloys mixtures, or compounds are considered suitable for a detector lining of this sort.

An important advantage of this lined detector either for use in this invention or independently is the increase in accuracy made possible by increasing the statistical counting rate. Since the phenomena accompanying the capture of neutrons in the detector lining are in the most favorable location for affecting the ionizable gas filling the detector, much greater ionization results than when all the rays must penetrate the detector wall from the outside.

This greater efficiency results in better well logs because, for a given logging speed and time constant of the detector, the statistical fluctuations are relatively smaller. Or for the same permissible fluctuations the speed of logging can be increased, or the detector time constant decreased, or both. Because of this improvement in detector 15, it is of advantage also to increase the sensitivity of gamma ray detector 16, such as by increasing its volume, so that the speed of logging by the method of this invention can be increased. As one of the drawbacks of conventional neutron logging is the length of shut-down time on wells, reduction of this time is economically important.

As shown in Figure 5, the opposite effect of decreasing capture ray generation in the chamber walls, or in other words making the detector 16 sensitive primarily to gamma rays and insensitive to neutrons, can be achieved best by shielding. In this case the ionization chamber, consisting of inner electrode 29 and outer wall or electrode 30, is entirely surrounded by a layer 31 of material, preferably boron or a boron-containing compound, having a large neutron capture cross section, but which either does not emit capture gamma rays at all or only very soft ones incapable of penetrating to the interior of the detector. Practically all of the slow neutrons reaching shield 31 are absorbed or captured by it without emitting penetrating radiations, with the result that virtually no slow neutrons are left to be captured in outer wall 30 or elsewhere in the interior of detector 16. Fast neutrons are neither captured by the boron nor do they produce appreciable ionization within the detector 16. Hence substantially only the gamma rays coming from outside detector 16, which readily penetrate shield 31 and wall 30, produce a response.

Another effect of boron shield 31 is to reduce the capture of neutrons by the fluids in well 10 and by the well walls. Nearly all of the slow neutrons moving about by thermal diffusion and coming in contact with shield 31 are captured by it. There is thus produced a gradient of concentration of slow neutrons, the concentration decreasing somewhat in passing from the rock through the hole fluids to shield 31. Consequently relatively fewer of the neutrons are left to be captured in the hole fluids, whereas farther away in the rocks the neutron concentration is affected but little if at all. The result is that the capture rays originating in the fluids in the hole are reduced considerably, while those originating in the rocks are of nearly the same intensity. The same effect takes place on the neutrons which might otherwise travel to the neutron detector 15. If the two detectors are closely spaced, the absorption in the boron may reduce the response of the neutron detector. This factor is to be considered in deciding what arrangement and spacing of detectors to use.

The nature of the information obtained in the practice of this invention and the manner of interpreting it will be more clearly understood by reference to Figure 6. An imaginary well section having both non-porous and porous or other strata is assumed, as shown by the log of the lithology appearing at the left. Log A is the conventional neutron log which would be obtained by present commercial equipment, while logs B and C are, respectively, the records produced by the neutron-responsive detector 15 and the gamma ray-responsive detector 16 of the present invention.

The similarities of the conventional log A and the log B made by the lined neutron-responsive detector 15 of my invention are at once apparent. In making these logs both the conventional detector and the lined detector of my invention are located approximately alike with respect to the neutron source, being spaced far enough away that the slow neutron density varies inversely with the porosity; that is, when the porosity increases, a larger fraction of the neutrons is slowed down nearer the source, and the detector output drops. The improvement of log B over log A is easily visible and consists chiefly in the reduction of the statistical fluctuations to comparatively small values, assuming the logging speeds are not too different.

While logs B and C made in accordance with the present invention exhibit certain features of similarity to each other, a comparison of the two brings out the real significance of the indications. At stratum 35, for example, the value of log B would indicate some porosity; but when the fact of strong gamma ray generation evidenced by log C is taken into consideration, it is realized that the reading of log B is thereby increased so that the true porosity is actually greater than might be supposed from log B alone. Also, this strong generation of capture gamma rays is a characteristic of stratum 35, different from its porosity, by which it may be recognized or correlated.

At stratum 36 very low porosity is indicated by log B, but the strong generation of gamma rays seen from log C shows that part of the log B reading may be attributed to this quality. Therefore, the porosity of stratum 36 may not actually be as low as it would otherwise be thought to be.

For stratum 37 log B indicates considerable porosity, while log C shows a notable reduction in gamma ray generation. Therefore, it is to be considered probable that strata 35 and 37 have about the same porosities. The difference in their values on log B can be attributed to the difference in gamma ray generation seen on log C.

At stratum 38 the combination of a further decrease in log C together with the small increase at this level on log B is a clear indication of a medium to low porosity. Log B would ordinarily have higher values clearly indicating this fact by itself if the contribution of the externally generated gamma rays to the neutron-responsive detector 15 were not abnormally low. The information of log C thus supplements and aids in the interpretation of log B. This combination of readings—low gamma ray generation and increased slow neutron density at these spacings—is characteristic of many shales.

This is the reason why the pronounced falling off of log C through stratum 39 is interpreted as an increasing content of shale. As practically all of the variation in log B over this depth interval may be considered as due to this effect, it may be correctly deduced that there is little if any variation in porosity throughout the stratum.

The peak appearing in the middle of stratum 40 on both logs B and C is clearly due to increasing gamma ray generation rather than any major variation in porosity. This stratum is therefore to be considered as all porous. The opposite effect is visible in the middle of the non-porous stratum 41, the dip in value appearing there on both logs being correlatable with the decreased gamma ray generation seen on log C rather than any significant variation in porosity.

It will be apparent that the information of log B relates chiefly to porosity while that of log C shows another type of change of lithology. For this reason log C is useful for independent correlations from well to well in addition to assisting the interpretations in a single well. However, the data recorded on each is properly used in supplementing and confirming the interpretation of the other. Inspection of both logs B and C permits the drawing of clear and definite conclusions about the nature of the strata penetrated by the well, where otherwise there would be doubt as to the meaning and magnitude of an anomaly observed on either curve alone.

While my invention has been described by referring to the foregoing specific embodiments, numerous modifications thereof will occur to those skilled in this art. The scope of this invention should therefore not be considered as limited to the described embodiments, but is to be defined by and includes such of these modifications as come within the scope of the appended claims.

I claim:

1. Apparatus for logging wells comprising a source of neutrons and two detectors of gamma rays spaced therefrom and adapted to be passed through a well, one of said detectors being surrounded by a shield containing boron and spaced from said source at a distance where variations in the hydrogen content of the formations of said well produce substantially no change in slow neutron density, the other of said detectors being lined with a substance having a large capture cross section for slow neutrons and in which captures are accompanied by the emission of ionizing radiations, and means for indicating as functions of depth in said well the responses of said detectors.

2. Apparatus for logging wells comprising an instrument housing adapted to be lowered into a well, a source of neutrons within said housing, two detectors of gamma rays within said housing and spaced from said source, one of said detectors having walls with greater ability than the walls of the other to generate gamma rays upon capturing slow neutrons, and the other of said detectors having a wall including an outer shield containing a material having a large capture cross section for slow neutrons, but in which material captures occur with the emission of substantially no penetrating gamma radiations, and means for indicating as functions of depth in said well the responses of said detectors.

3. Apparatus according to claim 2 in which said outer shield contains the element boron.

WILLIAM L. RUSSELL.

REFERENCES CITED

The following references are of record in the file of this patent:

UNITED STATES PATENTS

| Number | Name | Date |
| --- | --- | --- |
| 2,220,509 | Brons | Nov. 5, 1940 |
| 2,288,718 | Kallmann et al. | July 7, 1942 |
| 2,345,119 | Hare | Mar. 28, 1944 |
| 2,390,433 | Fearon | Dec. 4, 1945 |